United States Patent
Jeong et al.

(10) Patent No.: US 12,269,737 B2
(45) Date of Patent: Apr. 8, 2025

(54) METHOD FOR MANUFACTURING GALLIUM NITRIDE QUANTUM DOTS DOPED WITH METAL IONS

(71) Applicant: Korea University Research and Business Foundation, Seoul (KR)

(72) Inventors: Kwang Seob Jeong, Seoul (KR); Yun Chang Choi, Anyang-Si (KR)

(73) Assignee: Korea University Research and Business Foundation, Seoul (KR)

(*) Notice: Subject to any disclaimer, the term of this patent is extended or adjusted under 35 U.S.C. 154(b) by 797 days.

(21) Appl. No.: 17/284,520

(22) PCT Filed: May 8, 2019

(86) PCT No.: PCT/KR2019/005472
§ 371 (c)(1),
(2) Date: Apr. 12, 2021

(87) PCT Pub. No.: WO2020/075946
PCT Pub. Date: Apr. 16, 2020

(65) Prior Publication Data
US 2021/0340010 A1 Nov. 4, 2021

(30) Foreign Application Priority Data
Oct. 12, 2018 (KR) .......... 10-2018-0121699

(51) Int. Cl.
*C09K 11/62* (2006.01)
*C01B 21/06* (2006.01)
(Continued)

(52) U.S. Cl.
CPC .......... *C01B 21/0632* (2013.01); *C09K 11/62* (2013.01); *B82Y 20/00* (2013.01);
(Continued)

(58) Field of Classification Search
CPC ..... C09K 11/62; C09K 11/621; C09K 11/623; C09K 11/625; C09K 11/02;
(Continued)

(56) References Cited

U.S. PATENT DOCUMENTS

2007/0104865 A1* 5/2007 Pickett .................. B82Y 10/00
257/E29.071
2007/0194279 A1* 8/2007 Peng .................... C09K 11/584
977/773
(Continued)

FOREIGN PATENT DOCUMENTS

KR 10-2009-0054410 A 5/2009
KR 10-2015-0045196 A 4/2015
(Continued)

OTHER PUBLICATIONS

Tz-Jun Kuo et al., "Growth of Core#Shell Ga#GaN Nanostructures via a Conventional Reflux Method and the Formation of Hollow GaN Spheres", J. Phys. Chem. C, 2009, vol. 113, No. 9, pp. 3625-3630.
(Continued)

*Primary Examiner* — Matthew E. Hoban
*Assistant Examiner* — Lynne Edmondson
(74) *Attorney, Agent, or Firm* — Sughrue Mion, PLLC (57) ABSTRACT

The present invention relates to a method of manufacturing gallium nitride quantum dots, and more particularly, to a method of manufacturing gallium nitride quantum dots doped with metal ions, which uses a wet-based synthesis method capable of lowering the fluorescence energy of pure gallium nitride by introducing metal ions into pure gallium nitride.

12 Claims, 11 Drawing Sheets

(51) Int. Cl.
*C09K 11/02* (2006.01)
*C09K 11/08* (2006.01)
*B82Y 20/00* (2011.01)
*B82Y 30/00* (2011.01)
*B82Y 40/00* (2011.01)

(52) U.S. Cl.
CPC .............. *B82Y 30/00* (2013.01); *B82Y 40/00* (2013.01); *C01P 2004/64* (2013.01); *C01P 2006/60* (2013.01)

(58) Field of Classification Search
CPC . C09K 11/0883; C09K 11/0805; C09K 11/08; C01P 2004/64; C01P 2006/60; C01P 2002/54; B82Y 20/00; B82Y 30/00; B82Y 40/00
See application file for complete search history.

(56) References Cited

U.S. PATENT DOCUMENTS

| | | | | |
|---|---|---|---|---|
| 2011/0017951 | A1* | 1/2011 | Ryowa | .................... C09K 11/02 977/773 |
| 2012/0305845 | A1* | 12/2012 | Ryowa | ...................... C30B 7/00 252/301.36 |

FOREIGN PATENT DOCUMENTS

| | | |
|---|---|---|
| KR | 101665450 B1 | 10/2016 |
| KR | 10-2018-0033758 A | 4/2018 |

OTHER PUBLICATIONS

Niladri S. Karan et al., "Solution-Liquid-Solid Approach to Colloidal Indium Nitride Nanoparticles from Simple Alkylamide Precursors", Department of Chemistry, Michigan State University, Chem. Mater., 28, Supplementary Information, 2016, pp. 5601-5605.

Communication dated Apr. 28, 2021, issued by the Korea Patent Office in counterpart Korean Application No. 10-2018-0121699.

S. V. Bhat et al., "Synthesis and optical properties of In-doped GaN nanocrystals", Solid State Communications, 2007, vol. 141, 325-328, 5 pages.

Yun Chang Choi et al., "Blue Emission of α-GaN Colloidal Quantum Dots via Zn Doping", Chemistry of Materials, vol. 31, 5370-5375, 2019, 6 pages.

Written opinion for PCT/KR2019/005472 dated Aug. 8, 2019.

International search report for PCT/KR2019/005472 dated Aug. 8, 2019.

* cited by examiner

METHOD FOR MANUFACTURING GALLIUM NITRIDE QUANTUM DOTS DOPED WITH METAL IONS

CROSS-REFERENCE TO RELATED APPLICATIONS

This application is a National Stage of International Application No. PCT/KR2019/005472 filed May 8, 2019, which claims priority under U.S.C. § 119 (a) to Korean Patent Application No. 10-2018-0121699 filed on Oct. 12, 2018.

TECHNICAL FIELD

The present invention relates to a method of manufacturing gallium nitride quantum dots, and more particularly, to a method of manufacturing gallium nitride quantum dots doped with metal ions, which uses a wet-based synthesis method capable of lowering the fluorescence energy of pure gallium nitride by introducing metal ions into pure gallium nitride.

BACKGROUND ART

Quantum dots (QDs) are semiconductor nanoparticles. The quantum dots having a nanometer-sized diameter emit light when electrons in an unstable state drop from a conduction band to a valence band. In this case, the quantum dots emit light with shorter wavelengths as the quantum dots are smaller particles, whereas the quantum dots emit light with longer wavelengths as the quantum dots are larger particles. These are unique electrical and optical properties which are different from those of conventional semiconductor materials. Therefore, the size of the quantum dots may be controlled to display visible light with desired wavelengths and realize various colors at the same time by varying quantum dots with various sizes and quantum dot components.

Among these quantum dots, a gallium nitride semiconductor material has come into the global spotlight as an electronic material for a long period of time due to its unique properties. Among these properties, the bandgap transition energy corresponding to the near ultraviolet rays of the gallium nitride semiconductor material opens the possibility of using the gallium nitride semiconductor material as a blue light emitting material. However, because the fluorescence energy of pure gallium nitride corresponds to the ultraviolet region, such energy needs to be lowered by introducing metal impurities such as In, Mg, and the like into pure gallium nitride. Blue emission may be realized from the gallium nitride semiconductor material doped with metal ions in this way.

In general, various methods have been proposed to manufacture semiconductor materials. The synthesis of semiconductor materials, particularly, synthesis of nonosized semiconductor materials, which had been possible only with metal organic chemical vapor deposition or molecular-beam epitaxial growth, was possible using a solution process-based method. Therefore, the solution process-based method is gradually replacing conventional manufacturing methods because it has excellent economic feasibility.

However, for the most widely used gallium nitride semiconductor material, there is no research on chemical synthesis of such a material for practical use thereof. All of the gallium nitride used in conventional gallium nitride-based electronic materials is manufactured through metal organic chemical vapor deposition or molecular-beam epitaxial growth. The materials thus manufactured have excellent performance, but have a drawback in that it is difficult to mass-produce the electronic materials because they have limitations on a production method. Therefore, both metal organic chemical vapor deposition and molecular-beam epitaxial growth have problems in that they require a lot of money to set up a system, the synthesis of the materials is performed at a temperature close to 1,000° C., and maintenance costs of the devices are very high due to the toxicity of a precursor used.

Further, many blue light emitting materials have been synthesized using conventional chemical synthesis methods. Among them, materials based on CdSe, InP, and $CsPbX_3$ have has come into the spotlight in the case of nanocrystals. However, these materials have many difficulties in being used as a blue light-emitting material. In the case of CdSe and InP, first, because the bulk bandgap transition energy is in a near-infrared region, it is necessary to enhance the bandgap transition energy using a quantum confinement effect in order to emit light in the visible range. However, a very strong quantum effect is required for blue emission due to the low bandgap transition energy of a source material, thereby making it very difficult to synthesize CdSe and InP that emit blue light. A $CsPbX_3$ perovskite structure may emit blue light depending on the composition of halogen elements, but has many difficulties in being used as an electroluminescent material due to its inherent low stability.

Accordingly, there is need for research on a wet-based synthesis method capable of introducing metal ions into the gallium nitride semiconductor material.

DISCLOSURE

Technical Problem

Therefore, the present invention is directed to providing a method of manufacturing gallium nitride quantum dots, more particularly, a method of manufacturing gallium nitride quantum dots doped with metal ions, which uses a wet-based synthesis method capable of lowering the fluorescence energy of pure gallium nitride by introducing metal ions into pure gallium nitride.

Technical Solution

One aspect of the present invention provides a method of manufacturing gallium nitride quantum dots doped with metal ions, which includes: preparing a first solution including a first precursor including a group III element, a second precursor including a metal, and a compound for a ligand; performing a reaction between the first precursor and the second precursor in the first solution; controlling a temperature of the first solution within a first temperature range; and allowing the first solution to react with a second solution including a nitrogen-based compound and a solvent to form gallium nitride quantum dots doped with metal ions.

According to one embodiment, the first precursor may include a gallium halide.

According to one embodiment, the gallium halide may include one selected from the group consisting of gallium trichloride ($GaCl_3$), gallium tribromide ($GaBr_3$), and gallium triiodide ($GaI_3$).

According to one embodiment, the second precursor may include one selected from the group consisting of zinc (Zn), magnesium (Mg), and indium (In).

According to one embodiment, the compound for a ligand may include oleylamine.

According to one embodiment, the first temperature range may be in a range of 200° C. to 280° C.

According to one embodiment, the first solution may be allowed to react with the second solution for 1 hour to 3 hours.

According to one embodiment, the second solution may include lithium hexamethyldisilazide dissolved in anhydrous hexane.

According to one embodiment, the second solution may include oleylamine and a mixture of n-butyllithium and tetramethylethylenediamine.

According to one embodiment, after the formation of the gallium nitride quantum dots doped with metal ions, the above-described method of manufacturing gallium nitride quantum dots doped with metal ions may further include: removing impurities from a solution including the gallium nitride quantum dots doped with metal ions using a centrifugation method; mixing ethanol with the solution from which the impurities are removed; and separating the gallium nitride quantum dots doped with metal ions from the solution with which ethanol is mixed using a centrifugation method.

Another aspect of the present invention provides a gallium nitride quantum dot doped with metal ions, which has a ligand bound to a surface thereof, wherein the gallium nitride quantum dot is doped with metal ions to lower the bandgap transition energy of the gallium nitride.

According to one embodiment, the metal ions may include ions of one selected from the group consisting of zinc (Zn), magnesium (Mg), and indium (In).

According to one embodiment, the ligand may include oleylamine.

Still another aspect of the present invention provides an electronic device including the above-described quantum dot.

Advantageous Effects

According to one embodiment of the present invention, a gallium nitride quantum dot doped with metal ions can be provided using a chemical wet method.

According to one embodiment of the present invention, a gallium nitride quantum dot doped with metal ions can be provided with excellent economic feasibility through a rapid reaction within a short period of time.

According to one embodiment of the present invention, a gallium nitride quantum dot doped with metal ions can be provided with excellent economic feasibility because the gallium nitride system manufactured using a conventional deposition method may be used by itself.

According to one embodiment of the present invention, the interpretation of deposition-based nanocrystals can be directly applied to products of chemical synthesis using fluorescence at a defect level and fluorescence at a doping level at the same time.

According to one embodiment of the present invention, types of ligand atoms binding to the gallium nitride quantum dot can be controlled to control the relative intensity of luminous energy of the quantum dot.

According to one embodiment of the present invention, a blue light-emitting electronic device can be provided using the gallium nitride quantum dot doped with metal ions.

According to one embodiment of the present invention, electronic products such as a photodetector and the like, or semiconductors for adjusting light emission by means of metal ions can be provided using the gallium nitride quantum dot doped with metal ions.

BEST MODE

The terminology used herein is used for the purpose of only describing particular embodiments and is not intended to be limiting of exemplary embodiments. The singular forms "a," "an," and "the" are intended to include the plural forms as well, unless the context clearly indicates otherwise. It should be further understood that the terms "comprises," "comprising," "includes" and/or "including," when used herein, specify the presence of stated features and/or components thereof, but do not preclude the presence or addition of one or more other features and/or components thereof.

Unless defined otherwise, all terms used herein (including technical or scientific terms) have the same meaning as commonly understood by those of ordinary skill in the art to which the present invention belongs. It should be understood that the terms defined in generally used dictionaries are interpreted as including meanings identical to contextual meanings of the related art unless clearly defined otherwise in the present invention, and are not interpreted with being ideal or excessively formal meanings.

Hereinafter, a method of manufacturing gallium nitride quantum dots doped with metal ions according to the present invention will be described in detail with reference to the accompanying drawings. However, it should be understood that the accompanying drawings are provided for the purpose of illustration only, and are not intended to limit the method of manufacturing gallium nitride quantum dots doped with metal ions according to the present invention.

Figure 1:
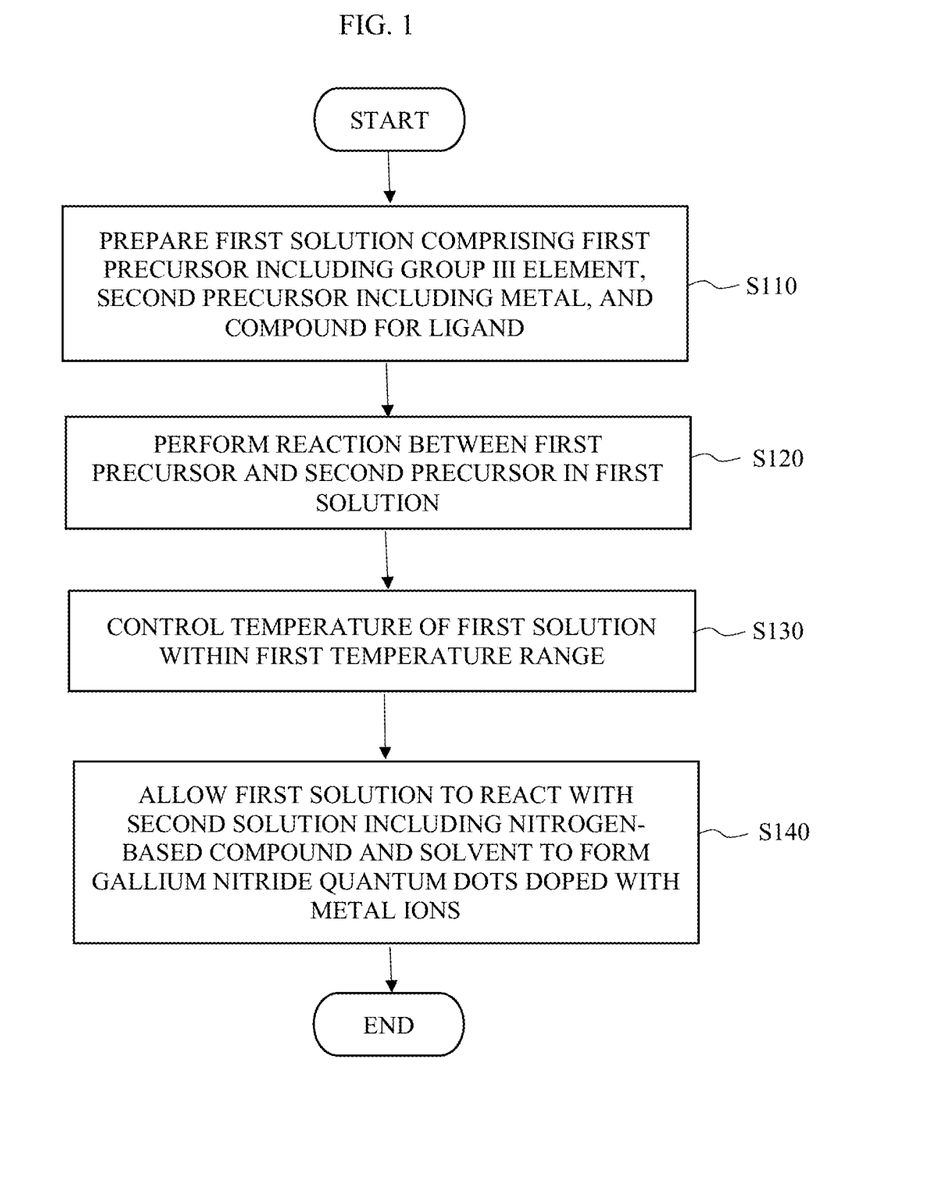
FIG. 1 is a flowchart of a method of manufacturing gallium nitride quantum dots doped with metal ions according to one embodiment of the present invention.

FIG. 1 is a flowchart of a method of manufacturing gallium nitride quantum dots doped with metal ions according to one embodiment of the present invention.

As shown in FIG. 1, the method of manufacturing gallium nitride quantum dots doped with metal ions according to one embodiment of the present invention includes: preparing a first solution including a first precursor including a group III element, a second precursor including a metal, and a compound for a ligand (S110); performing a reaction between the first precursor and the second precursor in the first solution (S120); controlling a temperature of the first solution within a second temperature range (S130); and allowing the first solution to react with a second solution including a nitrogen-based compound and a solvent to form gallium nitride quantum dots doped with metal ions (S140).

Hereinafter, each step of the present invention will be described in detail.

The present invention relates to a method of manufacturing gallium nitride quantum dots using a chemical wet method. First, a first solution, which includes a first precursor including a group III element, a second precursor including a metal, and a compound for a ligand, is prepared (S110).

For example, the group III element is gallium (Ga), and the first precursor includes gallium and halogen elements. Preferably, the first precursor is a gallium halide, and more preferably includes one selected from the group consisting of gallium trichloride ($GaCl_3$), gallium tribromide ($GaBr_3$), and gallium triiodide ($GaI_3$). Here, when considering the binding energy of the gallium halides, $GaCl_3$, $GaBr_3$, and $GaI_3$ have better reactivity in the given order. Hereinafter, the present invention will be described based on gallium trichloride ($GaCl_3$), but the present invention is not limited thereto.

According to one embodiment, the second precursor includes one selected from the group consisting of zinc (Zn), magnesium (Mg), and indium (In). According to one embodiment, the second precursor may also be one selected from a zinc halide, a magnesium halide, and an indium halide. Here, the halogen element is one selected from chlorine (Cl), bromine (Br), and iodine (I).

Hereinafter, the present invention will be described based on zinc chloride as a second precursor, but the present invention is not limited to zinc chloride and zinc ion dopants. When the above-described metal ions are included, the fluorescence energy of pure gallium nitride may be lowered. In this way, blue emission may be obtained from a gallium nitride semiconductor material doped with metal ions.

According to one embodiment, the contents of gallium and the metal (Zn) may be adjusted to a weight ratio of 1:0.5 to 3.5. When blue emission is required, the contents of Ga and Zn may be adjusted to 1:1. When strong ultraviolet emission is required, the contents of Ga and Zn may be adjusted to 1:3.

Here, the degree to which gallium nitride is doped with zinc varies depending on an amount of the zinc precursor and the reaction conditions. Specifically, the reaction temperature rises with an increasing amount of the zinc precursor, and an amount of zinc introduced into the gallium nitride increases with a longer reaction time and a higher reaction temperature. That is, the amount of the zinc precursor, the reaction temperature, and the reaction time may be properly controlled according to an intended purpose of the present invention to control an amount of zinc to be doped. In this way, a range of fluorescence energy of gallium nitride may be properly lowered from the ultraviolet region to the visible region.

According to one embodiment, the compound for a ligand includes oleylamine. The biggest characteristic of chemically synthesized quantum dots is that the physical properties of a core region are changed by an organic or inorganic ligand surrounding the quantum dots. Accordingly, various relative intensities of luminous energy of the quantum dots vary according to the type of ligand atoms binding to the gallium nitride quantum dots. That is, the type of ligand atom may be controlled according to an intended purpose of the present invention to control the intensity of luminous energy of the gallium nitride quantum dots.

Next, a reaction between the first precursor and the second precursor in the first solution is performed (S120).

According to one embodiment, the above-described reaction is a step for removing moisture and impurities in the reactants immediately before the main reaction, and is performed under vacuum. The reaction temperature is sufficient as long as moisture can be evaporated. According to one embodiment, the reaction may be performed at a temperature in the range of 100° C. to 120° C. The reaction occurs in this temperature range to synthesize a gallium-oleylamine precursor. Here, the synthesized precursor may be used for reaction without any particular separation process.

Then, the temperature of the first solution is controlled in a first temperature range (S130). According to one embodiment, the first temperature range is in a range of 200 to 280° C. Also, the second temperature range is higher than the temperature range of the above-described reaction.

When the first temperature is less than 200° C., the reaction does not proceed. When the second temperature is greater than 280° C., a solvent may evaporate as the temperature further increases to reach a boiling point (approximately 350° C.) of the solvent. In this case, the advantages from the chemical wet synthesis may be lost due to the excessively high temperature.

In this process, a reaction-ready state may be realized.

After preparing for the reaction, the first solution is allowed to react with the second solution including a nitrogen-based compound and a solvent to form gallium nitride quantum dots doped with metal ions (S140).

For example, the second solution includes lithium hexamethyldisilazide dissolved in anhydrous hexane. As another example, the reaction may also be performed using a second solution including a mixture of n-butyllithium and tetramethylethylenediamine. Here, oleylamine is used as the solvent.

The first solution may be allowed to react with the second solution to obtain gallium nitride quantum dots doped with metal ions as intended in the present invention. As the reaction proceeds, it can be seen that a clear solution changes to an opaque white color. According to one embodiment of the present invention, the first solution is allowed to react with the second solution for 1 to 3 hours.

Next, a heat source is removed to stop the reaction.

Then, impurities are removed from the solution including the gallium nitride quantum dots doped with metal ions using a centrifugation method. Also, the solution from which the impurities are removed is mixed with ethanol to reduce solubility of the quantum dots. Then, the gallium nitride quantum dots doped with metal ions are separated from the solution with which ethanol is mixed using a centrifugation method.

The gallium nitride quantum dots doped with metal ions may be obtained through such a series of processes.

A gallium nitride quantum dot doped with metal ions according to another embodiment of the present invention is a gallium nitride quantum dot having a ligand bound to a surface thereof. In this case, the gallium nitride quantum dot is doped with metal ions to lower the bandgap transition energy of gallium nitride.

According to one embodiment, the metal ions include ions of one selected from the group consisting of zinc (Zn), magnesium (Mg), and indium (In).

According to one embodiment, the ligand includes oleylamine.

An electronic device according to still another embodiment of the present invention includes the above-described quantum dots.

Hereinafter, the present invention will be described in further detail with reference to experimental examples thereof.

MODE FOR INVENTION

Experimental Example 1

To determine whether quantum dots of gallium nitride doped with zinc were formed by the above-described manufacturing method, an experiment was performed as follows.

Gallium chloride ($GaCl_3$) and zinc (II) chloride ($ZnCl_2$) were mixed at 1:1, and oleylamine was added to synthesize a gallium-oleylamine precursor. The precursor synthesized here was used for reaction without any particular separation process. Thereafter, a reaction-ready state was realized by adjusting a temperature of a gallium precursor solution to 200° C. After the reaction preparation was completed, a solution in which lithium hexamethyldisilazide was dissolved in anhydrous hexane was placed in a reaction vessel to initiate the reaction. The reaction proceeded for an hour, and a heat source was removed to stop the reaction. After the reaction was completed, the impurities which were not soluble in the solution were first removed from the solution in the reaction vessel using a centrifuge. The clear solution from which the impurities were removed was set aside. Thereafter, the clear solution was mixed with ethanol to reduce the solubility of colloidal quantum dots, and gallium nitride quantum dots doped with zinc were separated from the resulting mixture using a centrifuge, thereby manufacturing the zinc-doped gallium nitride quantum dots of Example 1.

Also, zinc-doped gallium nitride quantum dots of Example 2 were manufactured in the same manner as in Example 1, except that gallium chloride ($GaCl_3$) and zinc (II) chloride ($ZnCl_2$) were mixed at 1:2 to perform the reaction. In addition, zinc-doped gallium nitride quantum dots of Example 3 were manufactured in the same manner as in Example 1, except that gallium chloride (GaCl3) and zinc (II) chloride ($ZnCl_2$) were mixed at 1:3, and the reaction was performed at 250° C. Zinc-doped gallium nitride quantum dots of Example 4 were manufactured in the same manner as in Example 1, except that gallium chloride ($GaCl_3$) and zinc (II) chloride ($ZnCl_2$) were mixed at 1:3, and the reaction was performed at 280° C. Zinc-doped gallium nitride quantum dots of Example 5 were manufactured in the same manner as in Example 1, except that gallium chloride ($GaCl_3$) and zinc (II) chloride ($ZnCl_2$) were mixed at 1:3, and the reaction was performed at 280° C. for 3 hours.

Figure 2:
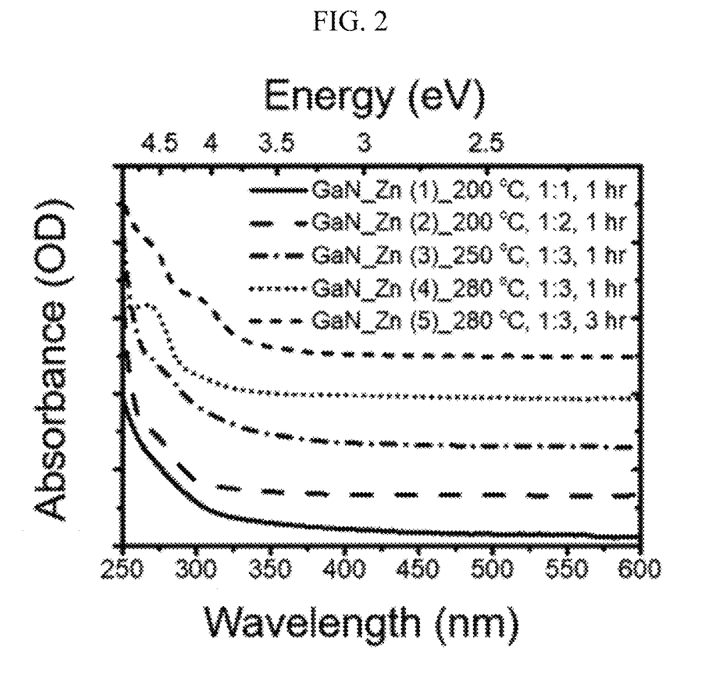
FIG. 2 is a graph showing the absorption spectra according to a reaction time and an amount of a zinc precursor.

Absorption spectra of the zinc-doped gallium nitride quantum dots of Examples 1 to 5 were measured. The results are shown in FIG. 2. As shown in FIG. 2, it can be seen that the bandgap transition absorption energy of the synthesized zinc-doped gallium nitride quantum dots was reduced as the synthesis conditions were changed from Example 1 to Example 5. This directly shows a quantum confinement effect of the quantum dots whose absorption energy decreased as the reaction proceeded. Also, it can be seen that the zinc ions served to promote a quantum dot reaction when the zinc-doped gallium nitride quantum dots of Examples 1 and 2 were compared.

Figure 3:
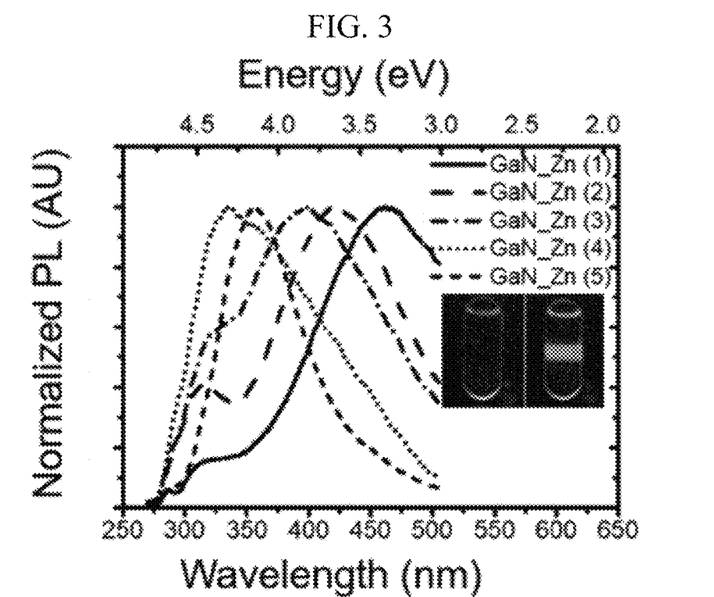
FIG. 3 is a graph showing the emission spectra according to the reaction time and the amount of the zinc precursor.

Also, emission spectra of the zinc-doped gallium nitride quantum dots of Examples 1 to 5 were measured. The results are shown in FIG. 3. As shown in FIG. 3, it can be seen that the energy of bandgap transition emission of the synthesized gallium nitride quantum dots was red-shifted as the reaction proceeded. This change was due to the red shifting of the absorption spectra as shown in FIG. 2. In addition, it is characteristic that the bandgap transition of ultraviolet rays and blue emission occurred in the zinc-doped gallium nitride quantum dots of Examples 1 and 2, indicating that the zinc ions were generated at an impurity level. Also, it can be seen that this blue emission was blue-shifted as a content of zinc in the gallium nitride increased. Because zinc strongly served to protect surfaces of the zinc-doped gallium nitride quantum dots rather than serve as a blue emission source as the content of zinc increased, blue emission decreased and ultraviolet emission became stronger. Therefore, stronger ultraviolet emission could be observed as shown in Example 5.

Figure 4:
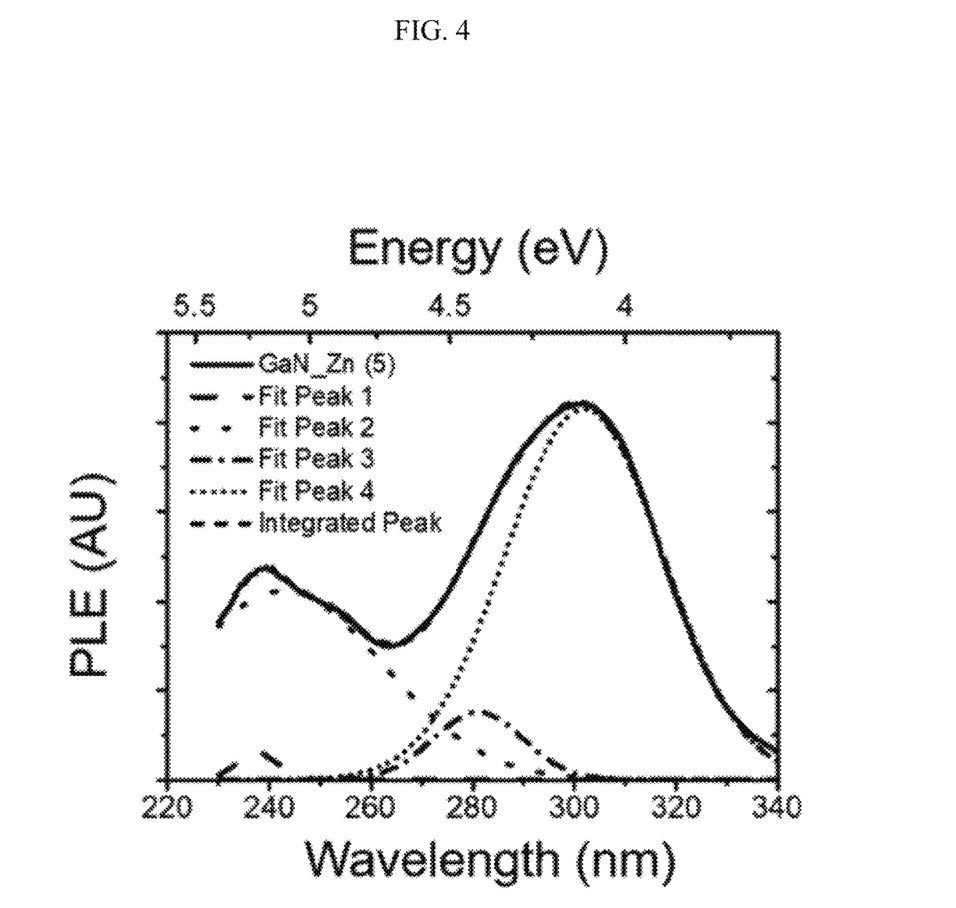
FIG. 4 is a graph showing the fluorescence excitation spectra according to the reaction time and the amount of the zinc precursor.

Further, the fluorescence excitation spectrum of the zinc-doped gallium nitride quantum dots of Example 5 was measured. The results are shown in FIG. 4. As shown in FIG. 4, it can be seen that the fluorescence excitation spectrum of the zinc-doped gallium nitride quantum dots of Example 5 was coincident with the absorption spectrum of Example 5 clearly shown in FIG. 2. This verifies that the fluorescence of Example 5 is originated from an electrical structure of the gallium nitride quantum dots.

Experimental Example 2

Figure 5:
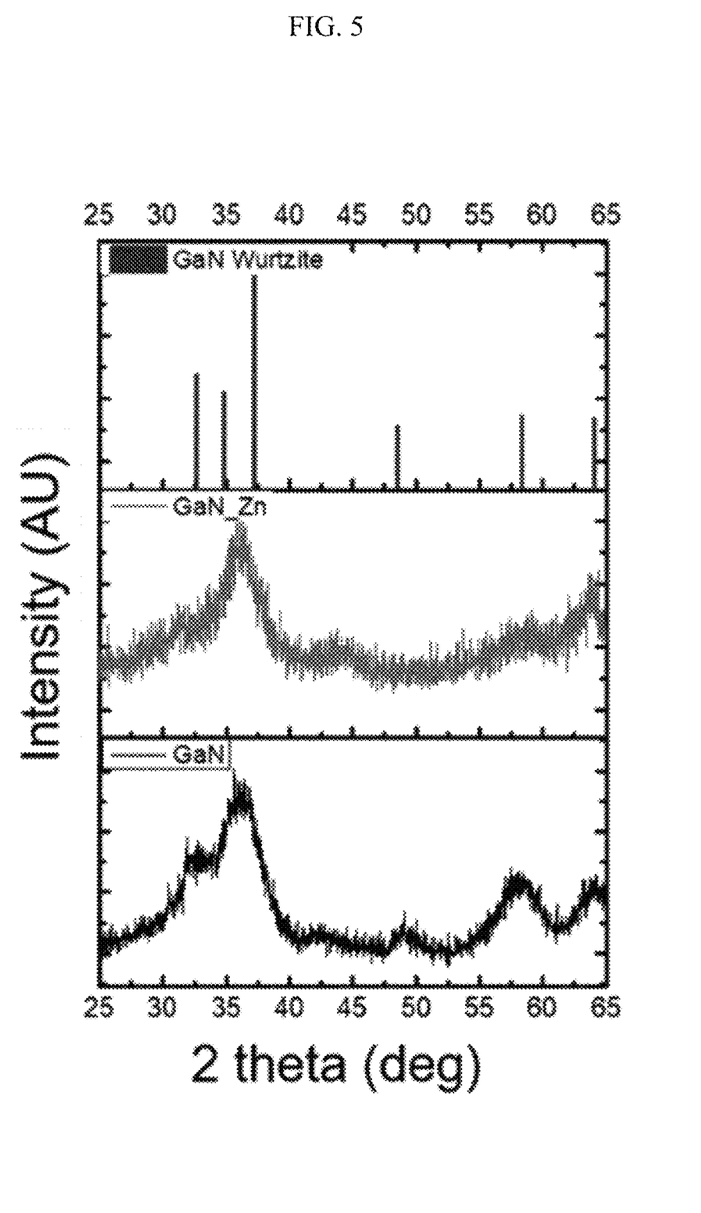
FIG. 5 is a graph showing an X-ray diffraction pattern.

An X-ray diffraction pattern of the sample of Example 1 was measured. The results are shown in FIG. 5. The diffraction pattern of the zinc-doped gallium nitride quantum dots of Example 1 of the present invention was not significantly different from the diffraction pattern of the gallium nitride quantum dots which were not doped with metal ions, which were used as a control. This indicates that the zinc ions did not damage a structure of the gallium nitride quantum dots because the zinc ions were present on surfaces of the gallium nitride quantum dots. However, because the pattern became wide due to the characteristics of the nano-sized particles, it was difficult to differentiate the diffraction spectrum of this example from that of γ-gallium oxide that was likely to be present as an impurity of the reaction.

Experimental Example 3

Figure 6:
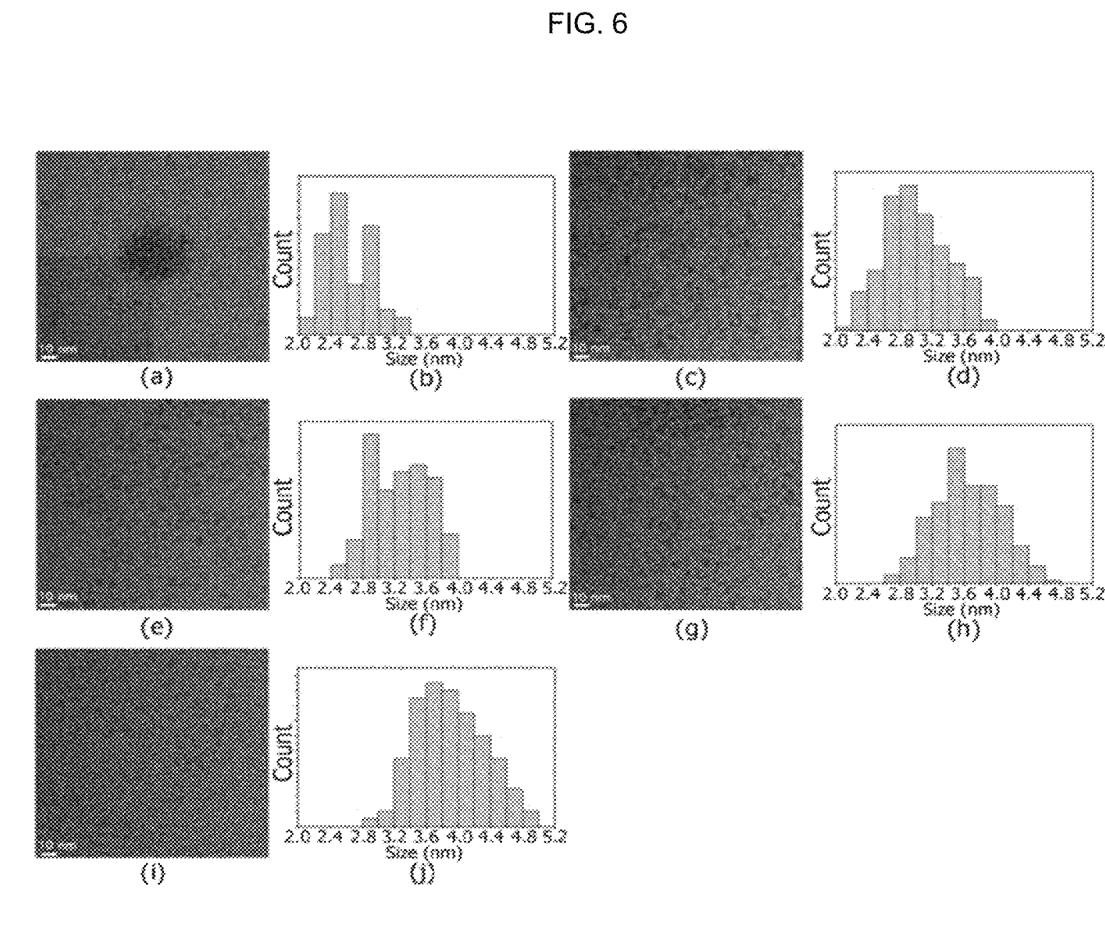
FIG. 6 is an electron microscope image of gallium nitride quantum dots doped with zinc. The size of the gallium nitride quantum dots are shown in the graph.

Each of the samples of Examples 1 to 5 was photographed using an electron microscope. The respective images are shown in FIG. 6, and the zinc ions were counted according to the size of the individual zinc ions, and shown in a graph. As shown in FIG. 6, it can be seen that the mean size of the particles increased as the reaction proceeded from Example 1 to Example 5. When this was examined with reference to FIGS. 2 and 3, the presence of the quantum confinement effect in the zinc-doped gallium nitride quantum dots could be directly explained.

Experimental Example 4

Figure 7:
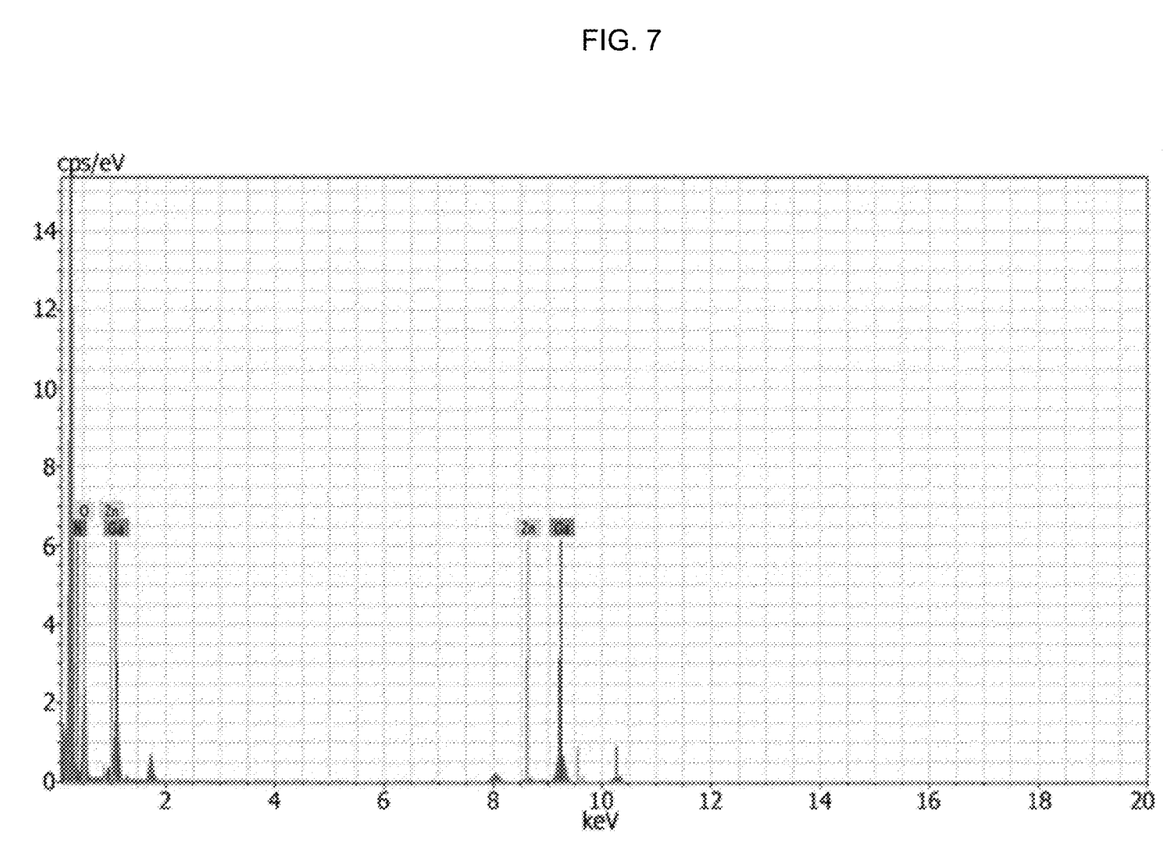
FIG. 7 is a graph showing the energy dispersion spectrum of the gallium nitride quantum dots doped with zinc.

The energy dispersion spectrum of the zinc-doped gallium nitride quantum dots of Example 1 was measured. The results are shown in FIG. 7. As shown in FIG. 7, peaks for zinc, gallium, and nitrogen were observed. Based on the results, it can be seen that the zinc-doped gallium nitride quantum dots were formed.

Experimental Example 5

The X-ray photoelectron spectrum of the zinc-doped gallium nitride quantum dots of Example 1 was measured after a film was formed on a silicon wafer. Graphs for the gallium region and the nitrogen region are shown in FIGS. 8 and 9, respectively.

Figure 8:
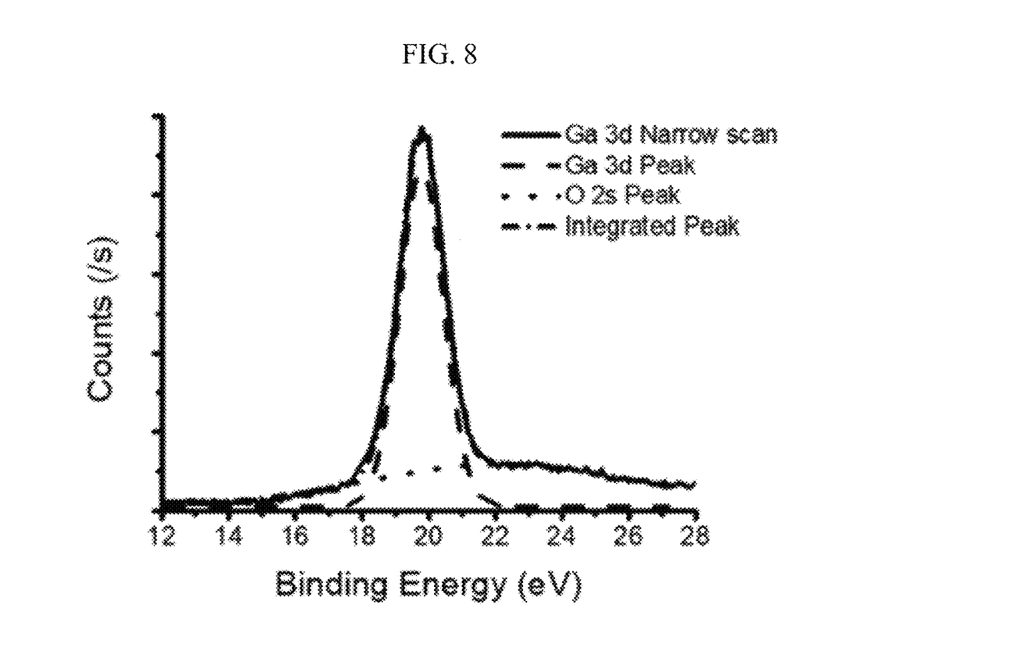
FIG. 8 is a graph showing the X-ray photoelectron spectrum of a gallium region of the gallium nitride quantum dots doped with zinc.
Figure 9:
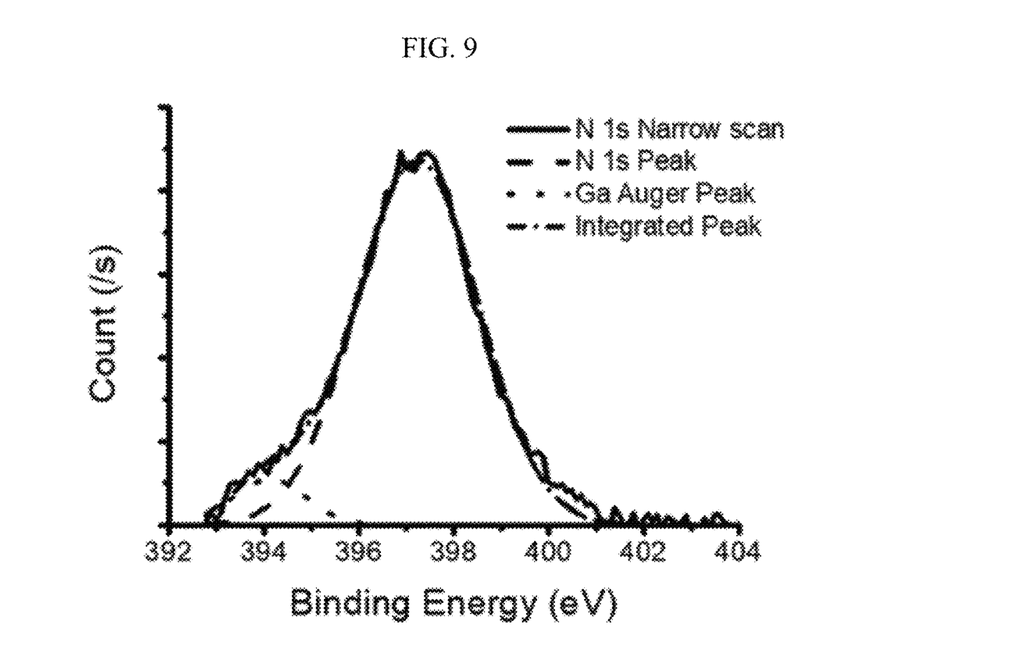
FIG. 9 is a graph showing the X-ray photoelectron spectrum of a nitrogen region of the gallium nitride quantum dots doped with zinc.

As shown in FIGS. 8 and 9, the binding energy of gallium and nitrogen regions on the X-ray photoelectron spectrum was analyzed. As a result, it can be seen that gallium and nitrogen elements were bound to each other in the reaction product of Example 1 to form crystals. Specifically, the results of measurement of the X-ray photoelectron spectrum showed that the reaction product of Example 1 had a binding energy of 19.78 eV in a 3d region of gallium and a binding energy of 397.3 eV in a is region of nitrogen, indicating that the binding energy values were exactly coincident with the values measured for bulk gallium nitride semiconductors material known in the related art.

Experimental Example 6

Figure 10:
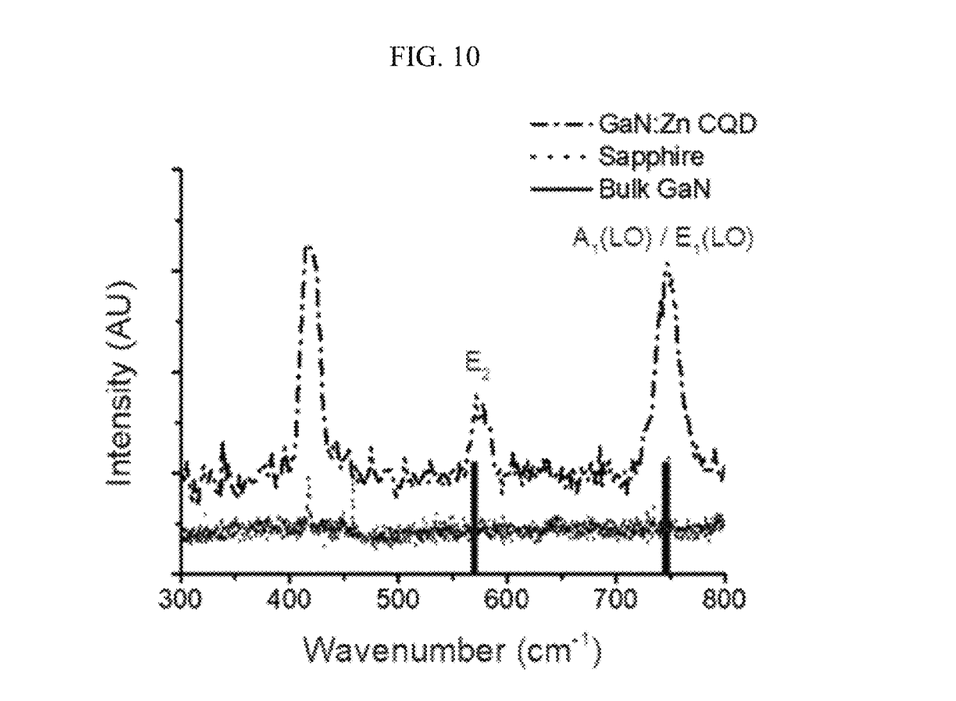
FIG. 10 is a graph showing the Raman spectrum of the gallium nitride quantum dots doped with zinc.

The Raman spectrum of the zinc-doped gallium nitride quantum dots of Example 1 was measured after a film was formed on an aluminum oxide wafer using spin-coating. The results are shown in FIG. 10. As shown in FIG. 10, the measured spectrum showed that γ-gallium oxide was not present and only gallium nitride was present in the material of Example 1. Based on the fact that the data of the measured spectrum was identical to that of undoped gallium nitride, it can also be seen that a crystal structure was not distorted by the introduced zinc ions.

Experimental Example 7

To check the characteristics of gallium nitride quantum dots bound to another ligand, an experiment was further performed, as follows.

To observe the innate optical properties of the quantum dots having no organic ligand, a film manufactured from zinc-doped gallium nitride was treated with cetyltrimethylammonium bromide (CTAB) so that oleylamine and oleic acid ligands present in the film were both replaced with bromine ions. Graphs showing the UV-Vis absorbance and IR absorbance of gallium nitride quantum dots in which the ligand was replaced with bromine ions are shown in FIGS. 11 and 12, respectively.

Figure 11:
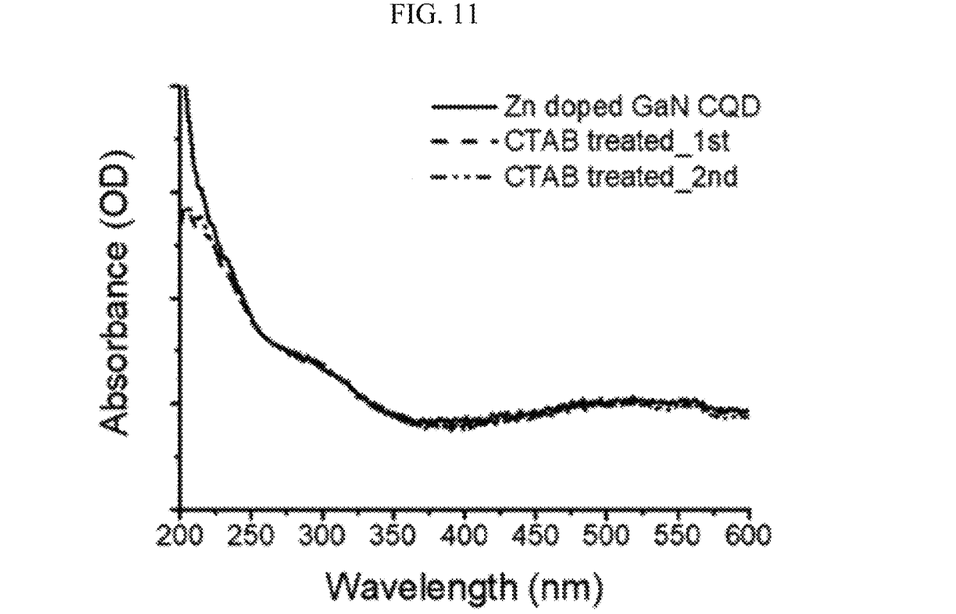
FIG. 11 is a graph showing the UV-Vis absorbance of the gallium nitride quantum dots in which a ligand is substituted with bromine ions.
Figure 12:
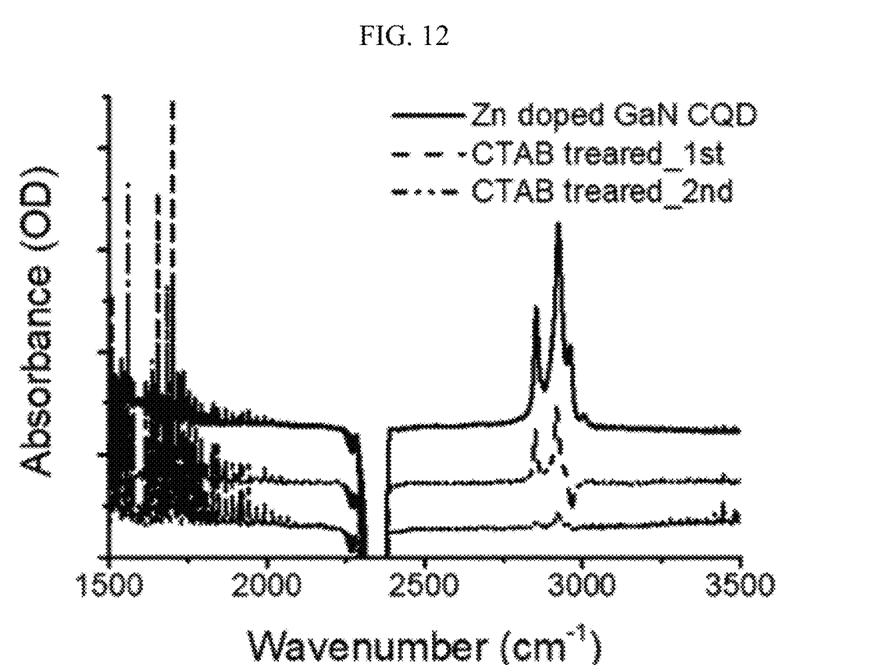
FIG. 12 is a graph showing the IR absorbance of the gallium nitride quantum dots in which the ligand is substituted with bromine ions.

As shown in FIGS. 11 and 12, it could be determined whether the ligand was replaced by determining whether there was a peak corresponding to the vibration energy of C—H on the FT-IR spectrum, and the optical properties were confirmed using an ultraviolet-visible spectrophotometer. It can be seen that the absorbance of the quantum dot film was still maintained even after the ligand was replaced with bromine ions. This verifies that the absorbance of the ultraviolet region observed in a solution state was not due to a π-bond of the ligand but arises from the quantum dots themselves.

To replace oleylamine as the ligand with oleic acid, replacement of the ligand was promoted using an ultrasonic disperser while applying heat to the zinc-doped gallium nitride synthesized in Example 1 in 10% by volume of an oleic acid-hexane solution. After the replacement of the ligand was completed, ethanol was added to the corresponding solution again to reduce the solubility of quantum dots. Thereafter, the quantum dots bound to the oleic acid ligand were separated using a centrifuge.

Figure 13:
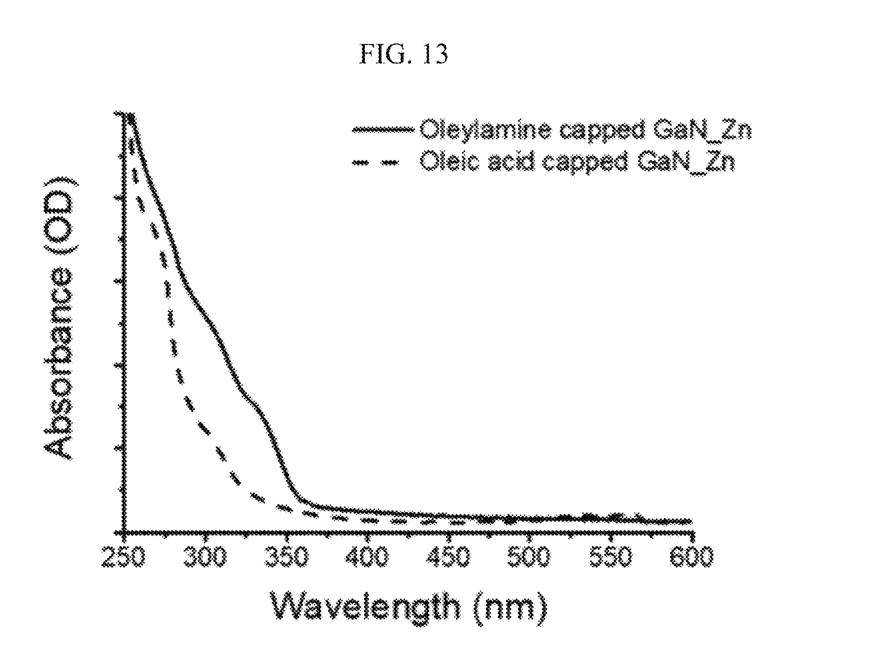
FIG. 13 is a graph showing the absorption spectrum of the gallium nitride quantum dots doped with zinc, which has oleylamine and oleic acid ligands bound thereto.
Figure 14:
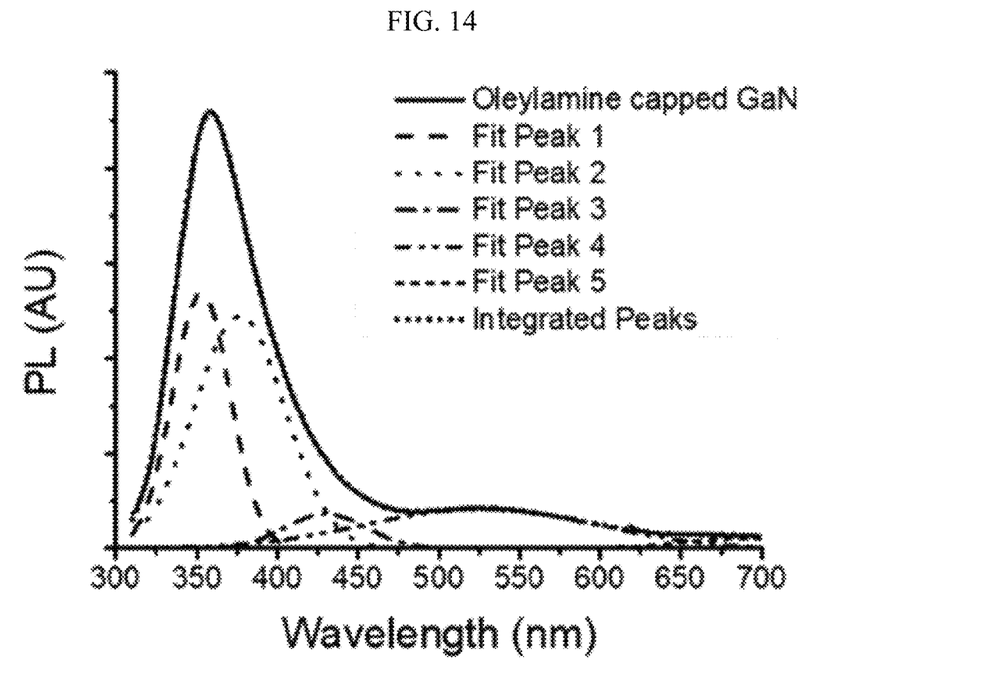
FIG. 14 is a graph showing the emission spectrum of the gallium nitride quantum dots doped with zinc, which has the oleylamine ligand bound thereto.
Figure 15:
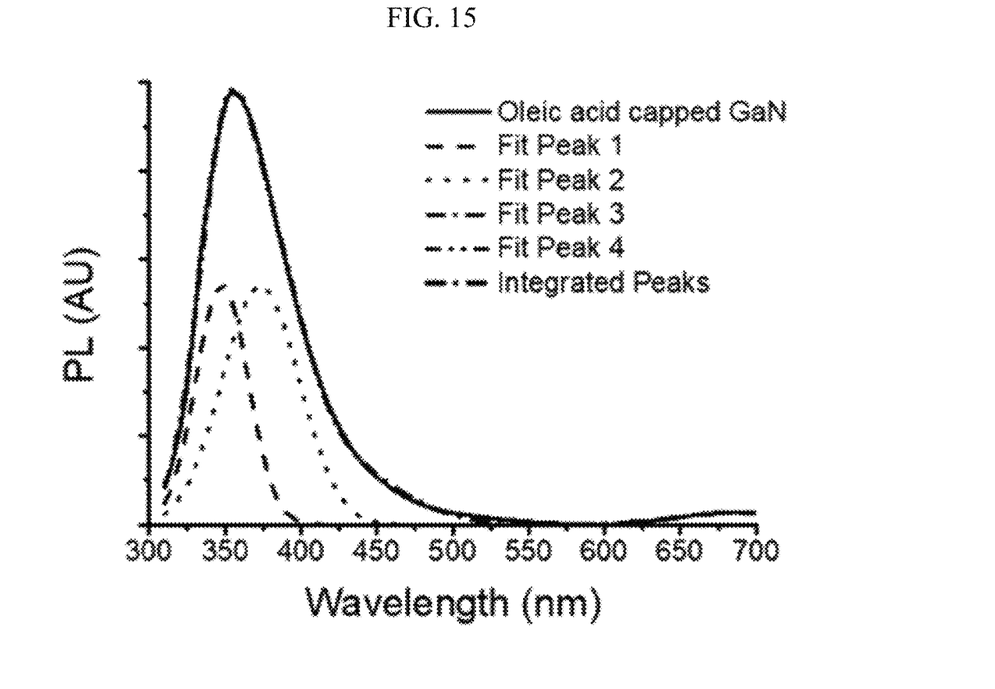
FIG. 15 is a graph showing the emission spectrum of the gallium nitride quantum dots doped with zinc, which has the oleic acid ligand bound thereto.

The absorption spectra of the zinc-doped gallium nitride quantum dots bound to the oleylamine and oleic acid ligands, respectively, were measured. The results are shown in FIG. 13. Also, the emission spectrum of the zinc-doped gallium nitride quantum dots bound to the oleylamine ligand was measured. The results are shown in FIG. 14. The emission spectrum of the zinc-doped gallium nitride quantum dots bound to the oleic acid ligand was measured. The results are shown in FIG. 15.

However, there was a significant difference in fluorescence when an amine-based ligand and an acid-based ligand were used. Specifically, when the amine ligand was used, exciton fluorescence intensity was weak, and the fluorescence associated with a deep trap level was observed in a low energy region. On the other hand, when the acid ligand was used, low energy fluorescence was not observed, and only exciton peaks were strongly observed.

Figure 16:
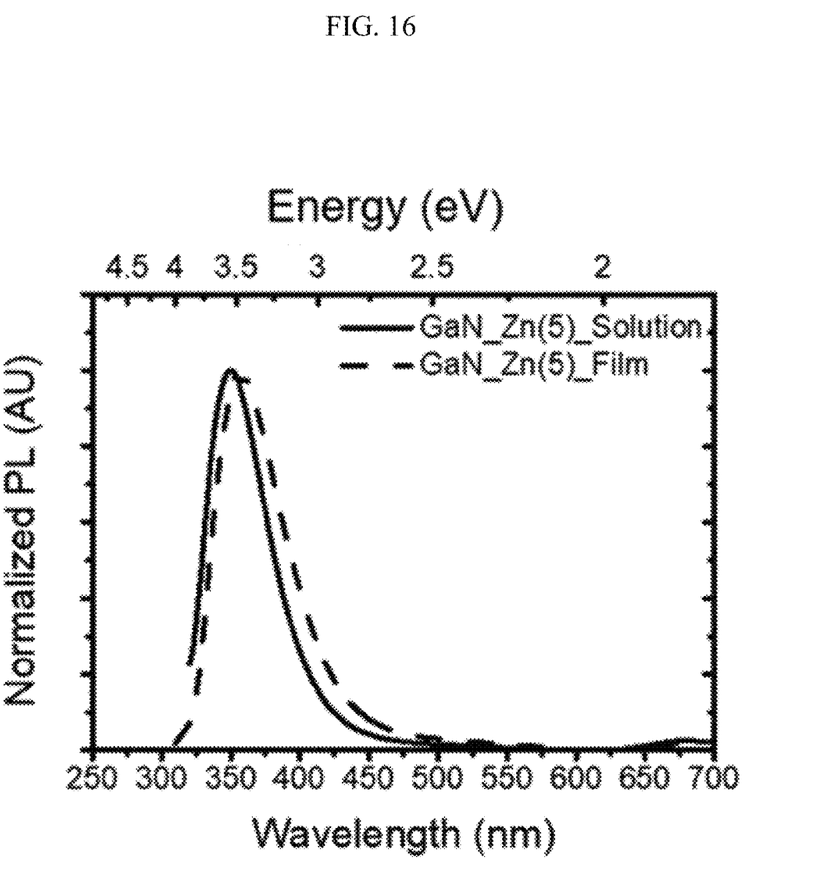
FIG. 16 is a graph of normalizing and comparing the emission spectra of the gallium nitride quantum dots doped with zinc in a solution state and the gallium nitride quantum dot doped with zinc coated onto a glass substrate.

As shown in FIG. 16, it can also be seen that the zinc-doped gallium nitride quantum dots could express the inherent properties exhibited in a solution phase even when in a state of a thin film coated onto a substrate. This suggests that the zinc-doped gallium nitride quantum dots provided in the present invention are directly applicable to various engineering applications through existing knowledge.

As shown in these Experimental Examples, it can be seen that the zinc-doped gallium nitride quantum dots could be provided by the manufacturing method of the present invention.

Although the present invention has been described in detail with reference to embodiments and examples thereof, the present invention is not limited to the embodiments, and may be embodied in various forms. Therefore, it will be apparent that various changes and modifications may be made by those skilled in the art without departing from the scope of the present invention. Also, it should be understood that various substitutions, changes, and modifications are possible by those skilled in the art without departing from the scope of the present invention defined in the claims, and these also fall within the scope of the present invention.

The invention claimed is:

1. A method of manufacturing gallium nitride quantum dots doped with metal ions, comprising:
    preparing a first solution comprising a first precursor including a group III element, a second precursor including a metal, and a compound for a ligand;
    performing a reaction between the first precursor and the second precursor in the first solution;
    controlling a temperature of the first solution within a first temperature range; and allowing the first solution to react with a second solution in which a nitrogen-based compound is dissolved in a solvent to form gallium nitride quantum dots doped with metal ions.

2. The method of claim 1, wherein the first precursor comprises a gallium halide.

3. The method of claim 2, wherein the gallium halide comprises one selected from the group consisting of gallium trichloride ($GaCl_3$), gallium tribromide ($GaBr_3$), and gallium triiodide ($GaI_3$).

4. The method of claim 1, wherein the second precursor comprises one selected from the group consisting of zinc (Zn), magnesium (Mg), and indium (In).

5. The method of claim 1, wherein the compound for a ligand comprises oleylamine.

6. The method of claim 1, wherein the first temperature range is in a range of 200° C. to 280° C.

7. The method of claim 1, wherein the first solution is allowed to react with the second solution for 1 hour to 3 hours.

8. The method of claim 1, wherein the second solution comprises lithium hexamethyldisilazide dissolved in anhydrous hexane.

9. The method of claim 1, wherein the second solution comprises oleylamine and a mixture of n-butyllithium and tetramethylethylenediamine.

10. The method of claim 1, further comprising, after the formation of the gallium nitride quantum dots doped with metal ions:

removing impurities from a solution comprising the gallium nitride quantum dots doped with metal ions using a centrifugation method;

mixing ethanol with the solution from which the impurities are removed; and separating the gallium nitride quantum dots doped with metal ions from the solution with which ethanol is mixed, using a centrifugation method.

11. A gallium nitride quantum dot doped with zinc ions, the gallium nitride quantum having an oleylamine ligand bound to a surface thereof, wherein the gallium nitride quantum dot is doped with zinc ions to lower the bandgap transition energy of the gallium nitride, and wherein bandgap transition of ultraviolet rays and blue emission occur in the gallium nitride quantum dot doped with the zinc ions.

12. An electronic device comprising the quantum dot defined in claim 11.

* * * * *